United States Patent
Van Nieuwstadt (10) Patent No.: US 11,346,295 B2
(45) Date of Patent: May 31, 2022

(54) METHODS AND SYSTEMS FOR HEATING AN AFTER TREATMENT DEVICE VIA AN INTERNAL COMBUSTION ENGINE

(71) Applicant: Ford Global Technologies, LLC, Dearborn, MI (US)

(72) Inventor: Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 3 days.

(21) Appl. No.: 16/984,441

(22) Filed: Aug. 4, 2020

(65) Prior Publication Data

US 2022/0042471 A1  Feb. 10, 2022

(51) Int. Cl.
  *F02D 41/02* (2006.01)
  *F01N 3/021* (2006.01)
  *F02D 41/00* (2006.01)
  *F02D 13/02* (2006.01)
  *F01N 3/10* (2006.01)

(52) U.S. Cl.
  CPC .......... *F02D 41/025* (2013.01); *F01N 3/021* (2013.01); *F01N 3/101* (2013.01); *F02D 13/0207* (2013.01); *F02D 13/0249* (2013.01); *F02D 41/0082* (2013.01)

(58) Field of Classification Search
  CPC ...... F01N 3/021; F01N 3/101; F02D 13/0207; F02D 13/049; F02D 41/0082; F02D 41/025
  See application file for complete search history.

(56) References Cited

U.S. PATENT DOCUMENTS

| | | | |
|---|---|---|---|
| 4,592,315 A | 6/1986 | Kobayashi et al. | |
| 6,286,478 B1 | 9/2001 | Atago et al. | |
| 7,869,929 B2 | 1/2011 | Sugihara | |
| 8,276,556 B2 | 10/2012 | Knauf et al. | |
| 2001/0025486 A1* | 10/2001 | Ogiso | F02D 41/008 60/285 |
| 2006/0157024 A1 | 7/2006 | Tomii | |
| 2008/0011282 A1* | 1/2008 | Miyashita | F01N 13/107 123/672 |
| 2009/0133387 A1* | 5/2009 | Nishizawa | F02D 41/029 60/286 |
| 2017/0145946 A1* | 5/2017 | Korenaga | F02D 41/008 |
| 2020/0149437 A1 | 5/2020 | Shelby | |

FOREIGN PATENT DOCUMENTS

DE  19940854 A1  3/2000

* cited by examiner

*Primary Examiner* — Audrey B. Walter
(74) *Attorney, Agent, or Firm* — Geoffrey Brumbaugh; McCoy Russell LLP (57) ABSTRACT

Systems and methods for heating an exhaust after treatment device and producing smooth engine torque output are described. In one example, exhaust valve opening time is adjusted to compensate for additional torque that may be generated via combusting rich air-fuel mixtures in cylinders. In addition, intake valve lift may be adjusted to compensate for additional torque that may be generated via combusting rich air-fuel mixtures in cylinders.

19 Claims, 6 Drawing Sheets

METHODS AND SYSTEMS FOR HEATING AN AFTER TREATMENT DEVICE VIA AN INTERNAL COMBUSTION ENGINE

FIELD

The present description relates to a system and methods for heating an exhaust gas after treatment device via engine exhaust gas. The system and methods may provide improved engine torque control during after treatment device heating.

BACKGROUND AND SUMMARY

An engine may include an exhaust gas after treatment device to process engine exhaust gases. The after treatment device may trap particulate matter or reduce NOx to $N_2$. However, the after treatment device may not operate as efficiently as may be desired when a temperature of the after treatment device is less than a threshold temperature. In addition, if the after treatment device is a particulate filter, the particulate filter may become filled with carbonaceous soot over time, which may increase exhaust system backpressure if the carbonaceous soot is not oxidized from time to time. One way to heat an after treatment device is to increase exhaust gas temperature, and exhaust gas temperature may be increased via retarding spark timing. Nevertheless, retarding spark timing may reduce engine efficiency more than may be desired and degrade combustion stability such that engine torque production may tend to vary. Therefore, it may be desirable to provide a more efficient way of heating an after treatment device while providing smooth engine torque production.

The inventor herein has recognized the above-mentioned issues and has developed an engine operating method, comprising: combusting rich air-fuel mixtures in a first group of cylinders and combusting lean air-fuel mixtures in a second group of cylinders via a controller in response to a request to heat an exhaust after treatment device; and advancing exhaust valve opening time in the first group of cylinders and retarding exhaust valve closing timing in the second group of cylinders via the controller to equalize torque production between the first group of cylinders and the second group of cylinders.

By adjusting exhaust valve opening times in a first group of cylinders that is combusting a rich air-fuel mixtures and adjusting exhaust valve opening times in a second group of cylinders that is combusting lean air-fuel mixtures, it may be possible to provide the technical result of supplying exhaust byproducts of rich and lean combustion to an exhaust after treatment device so that hydrocarbons from rich combustion may be oxidized by excess oxygen from lean combustion in an exhaust after treatment device, thereby increasing the temperature of the exhaust after treatment device. In addition, torque generated via the group of cylinders combusting rich air-fuel mixtures may be equalized with torque generated via the group of cylinder combusting lean air-fuel mixtures so that smooth torque may be provided by the engine.

The present description may provide several advantages. For example, the approach may improve heating of an exhaust after treatment device. In addition, the approach may provide smooth engine torque output via adjusting valve timing and/or valve lift. Further, the approach may be applicable to in-line engines and V engines.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
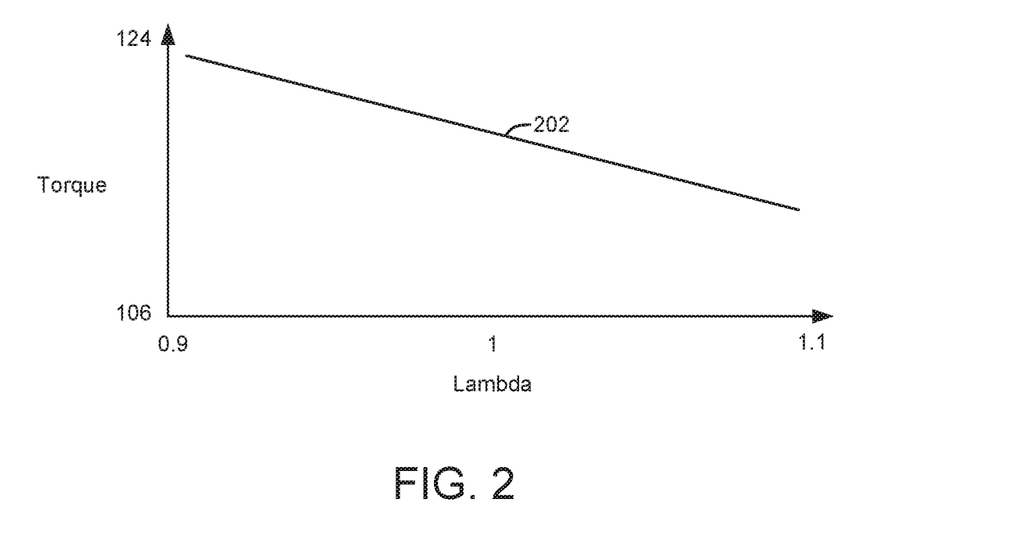
FIGS. 2-4 show plots that illustrate relationships between engine torque and Lambda, engine torque and EVO, and engine torque and intake valve lift.
Figure 3:
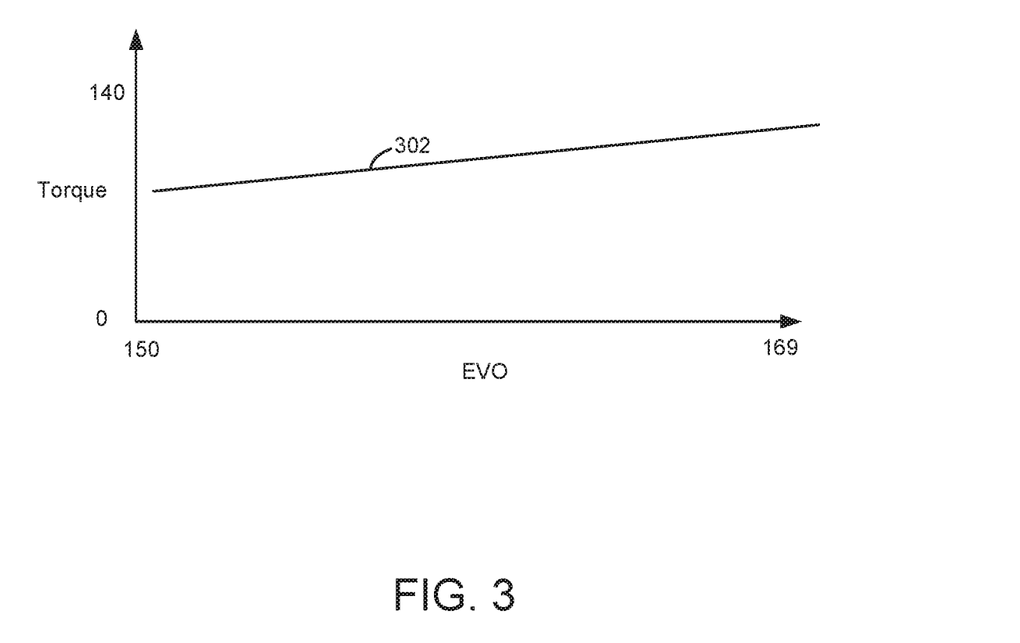
Figure 4:
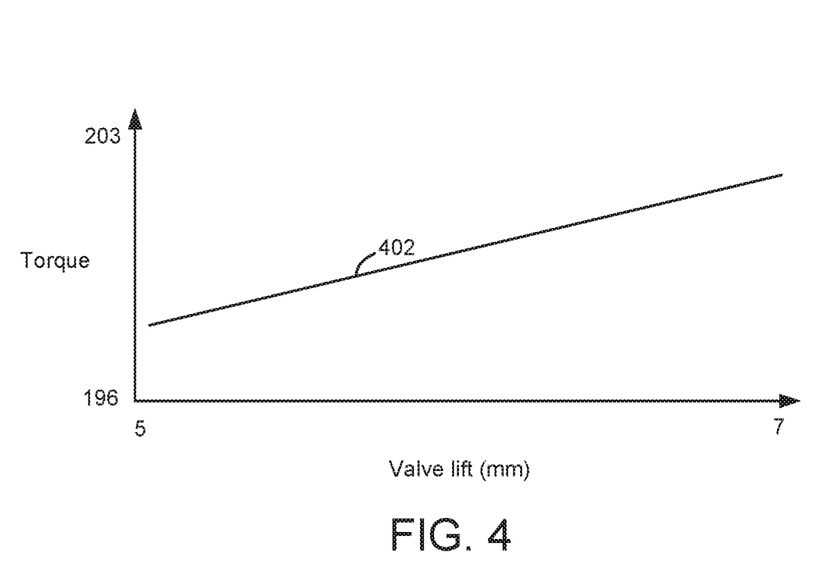

The present description is related to heating an exhaust gas after treatment device in a way that allows an engine to generate smooth torque output. The engine may be of the type shown in FIG. 1. Alternatively, the engine may be a diesel engine. The engine may include variable valve lift and variable valve timing. In one example, a group of engine cylinders is operated with rich air-fuel mixtures and a group of engine cylinders is operated with lean air-fuel mixtures. The combustion byproducts of cylinders combusting rich air-fuel mixtures may be oxidized by the combustion byproducts of cylinders combusting lean air-fuel mixtures in or at a location of an exhaust after treatment device so that the exhaust gas after treatment device may be heated to improve performance of the exhaust gas after treatment device. Engine torque between the groups of cylinders may be equalized via adjusting intake valve lift and exhaust valve opening time as indicated in FIGS. 2-4. The engine may be operated according to the sequence of FIG. 5 and the method of FIG. 6. The engine may be configured as shown in FIGS. 7A and 7B.

Figure 1:
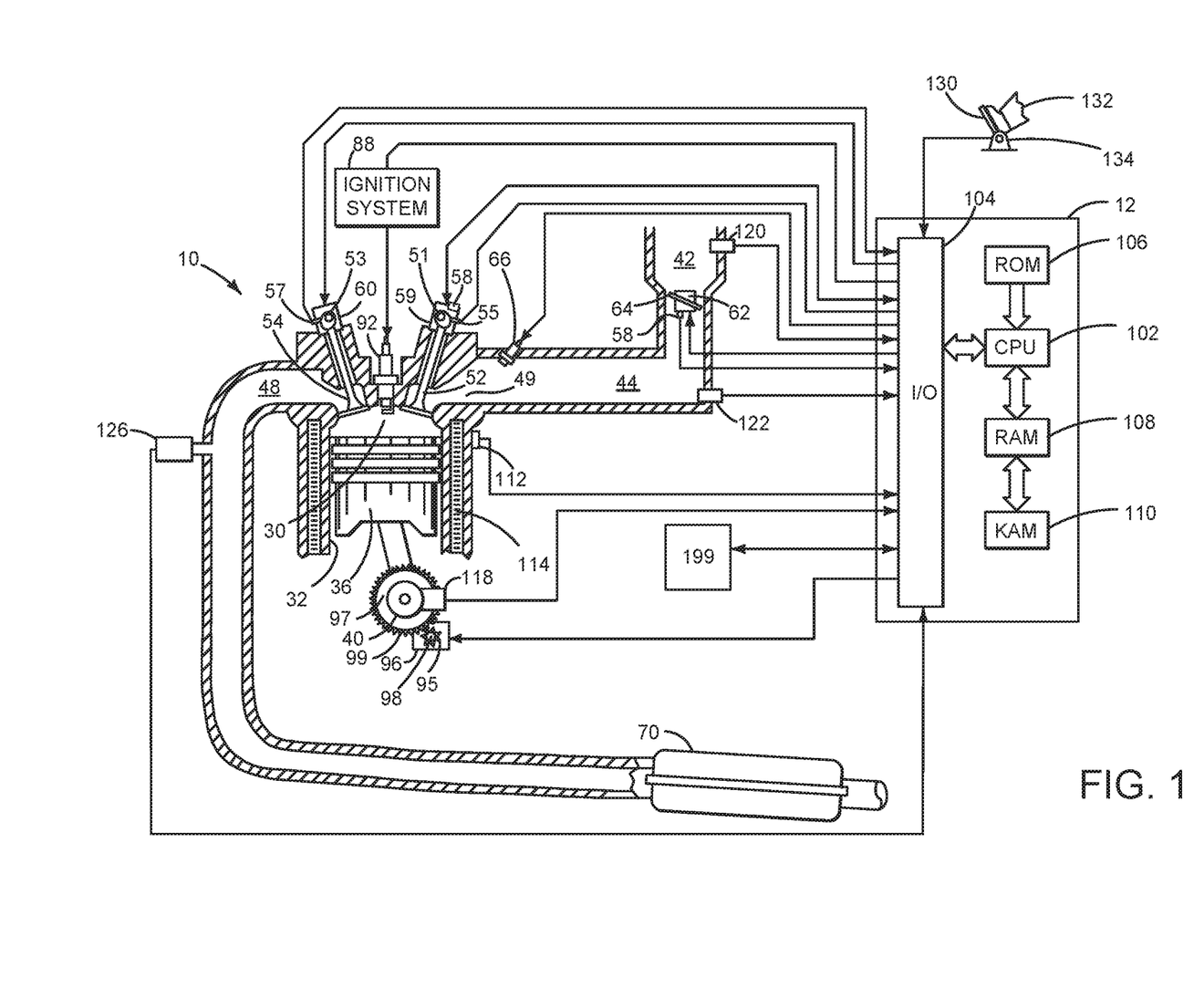
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Phase of intake cam 51 and exhaust cam 53 may be moved relative to crankshaft 40 via variable intake cam actuator 59 and variable exhaust cam actuator 60. A lift amount of intake valve 52 may be continuously adjusted via variable lift actuator 58. The variable valve timing and lift actuators may be of the type described in U.S. Pat. Nos. 7,869,929; 8,276,556; or U.S. Patent Application Number 2020/0149437, which are hereby fully incorporated in their entirety for all purposes, or other known valve actuator.

Fuel injector 66 is shown positioned to inject fuel directly into cylinder intake port 49, which is known to those skilled in the art as port fuel injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Timing of spark delivery may be advance or retarded relative to a position of crankshaft 40 for each cylinder.

Universal Exhaust Gas Oxygen (UEGO) sensor 126 is shown coupled to exhaust manifold 48 upstream of exhaust after treatment device 70. In some examples, a two-state exhaust gas oxygen sensor may be substituted for UEGO sensor 126. In one example, exhaust after treatment device 70 may be a three-way catalyst. In another example, exhaust after treatment device 70 may be a particulate filter. Exhaust after treatment device 70 can include multiple catalyst bricks, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a propulsion pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may receive requests from human/machine interface 199. Additionally, human/machine interface 199 may display pertinent engine data provided by controller 12. In one example, human/machine interface 199 may be a touch screen display. In other examples, human/machine 199 may be a key switch, push button, or other known input device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC).

In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

The system of FIG. 1 provides for a vehicle system, comprising: an engine including a first group of cylinders and a second group of cylinders; an exhaust gas after treatment device in pneumatic communication with the engine; and a controller including executable instructions stored in non-transitory memory to combust rich air-fuel mixtures in the first group of cylinders and lean air-fuel mixtures in the second group of cylinders in response to a request to heat an exhaust gas after treatment device, and decreasing intake valve lift in the first group of cylinders and increasing intake valve lift in the second group of cylinders in response to the request to heat the exhaust gas after treatment device. The system includes where the intake valve lift of the first group of cylinders is decreased to reduce torque production of the first group of cylinders such that torque produced by the first group of cylinders combusting the rich air-fuel mixtures at a first engine speed and driver demand torque is equivalent torque produced by the first group of cylinders combusting stoichiometric air-fuel mixtures at the first engine speed and driver demand torque with nominal intake valve lift. The system includes where the intake valve lift in the second group of cylinders is increased to increase torque production of the second group of cylinders such that torque produced by the second group of cylinders combusting the lean air-fuel mixtures at a first engine speed and driver demand torque is equivalent torque produced by the second group of cylinders combusting stoichiometric air-fuel mixtures at the first engine speed and driver demand torque with nominal intake valve lift. The system includes where the after treatment device is a particulate filter. The system includes where the after treatment device is a three-way catalyst. The system includes where the intake valve lift in the first group of cylinders is a function of a torque that is based on the rich air-fuel mixtures in the first group of cylinders. The system includes where the intake valve lift in the second group of cylinders is a function of a torque that is based on the lean air-fuel mixtures in the second group of cylinders.

Referring now to FIG. 2, a plot illustrating a relationship between cylinder air-fuel mixture and engine torque is shown. The relationship may be a basis for adjusting exhaust valve opening timing (EVO) and intake valve lift during heating of an exhaust after treatment device.

The plot includes a vertical axis that represents engine torque and engine torque increases in the direction of the vertical axis arrow. The horizontal axis represents Lambda (e.g., engine air-fuel ratio/stoichiometric air-fuel ratio) and Lambda increases in the direction of the horizontal axis arrow. Lower Lambda values represent richer air-fuel mixtures and higher Lambda values represent leaner air-fuel mixtures. Trace 202 represents the relationship between engine torque and Lambda values of air-fuel mixtures being combusted in the engine.

Line 202 shows that engine output torque may increase with decreasing Lambda, at least within a predefined Lambda operating region for the engine. Thus, if air-fuel mixtures for one or more cylinders are enriched (e.g., reduced Lambda values), then engine torque output may be increased. In addition, if air-fuel mixtures for one or more cylinders are made leaner (e.g., larger Lambda values), then engine torque output may be decreased. Consequently, if two groups of cylinders of an engine are operated at nominal valve timings and valve lift amounts while one group of cylinders operates with richer air-fuel mixtures and the other group of cylinders operates with leaner air-fuel mixtures, the two groups of cylinders may generate different amounts of torque, which may cause engine torque to fluctuate and lead to elevated noise and vibration harshness which is undesirable for the driver.

Referring now to FIG. 3, a plot illustrating a relationship between cylinder EVO and engine torque is shown. The relationship may be a basis for adjusting EVO during heating of an exhaust after treatment device.

The plot includes a vertical axis that represents engine torque and engine torque increases in the direction of the vertical axis arrow. The horizontal axis represents EVO timing and EVO timing is retarded in the direction of the horizontal axis arrow. Trace 302 represents the relationship between engine torque and EVO values.

Line 302 shows that engine output torque may increase with retarded EVO timing, at least within a predefined EVO operating region for the engine. Thus, if EVO timing for one or more cylinders is retarded, engine torque output may be increased. In addition, if EVO timing for one or more cylinders is advanced, engine torque output may be decreased. Consequently, if one group of engine cylinders is operated with a richer air-fuel mixture and advanced EVO timing, the one cylinder group may generate torque that is equivalent to the one cylinder group operating with stoichiometric air-fuel mixtures and nominal EVO timing. Likewise, if the other group of engine cylinders is operated with a lean air-fuel mixture and retarded EVO timing, the other cylinder group may generate torque that is equivalent to the other cylinder group operating with stoichiometric air-fuel mixtures and nominal EVO timing.

Referring now to FIG. 4, a plot illustrating a relationship between intake valve lift and engine torque is shown. The relationship may be a basis for adjusting intake valve lift during heating of an exhaust after treatment device.

The plot includes a vertical axis that represents engine torque and engine torque increases in the direction of the vertical axis arrow. The horizontal axis represents intake valve lift and intake valve lift is increased in the direction of the horizontal axis arrow. Trace 402 represents the relationship between engine torque and intake valve lift.

Line 402 shows that engine output torque may increase with increased intake valve lift, at least within a predefined intake valve lift region for the engine. Thus, if intake valve lift for one or more cylinders is increased, engine torque output may be increased. In addition, if intake valve lift for one or more cylinders is decreased, engine torque output may be decreased. Consequently, if one group of engine cylinders is operated with a richer air-fuel mixture and lower intake valve lift, the one cylinder group may generate torque that is equivalent to the one cylinder group operating with stoichiometric air-fuel mixtures and nominal intake valve lift. Likewise, if the other group of engine cylinders is operated with a lean air-fuel mixture and increased intake valve lift, the other cylinder group may generate torque that is equivalent to the other cylinder group operating with stoichiometric air-fuel mixtures and nominal EVO timing.

Figure 5:
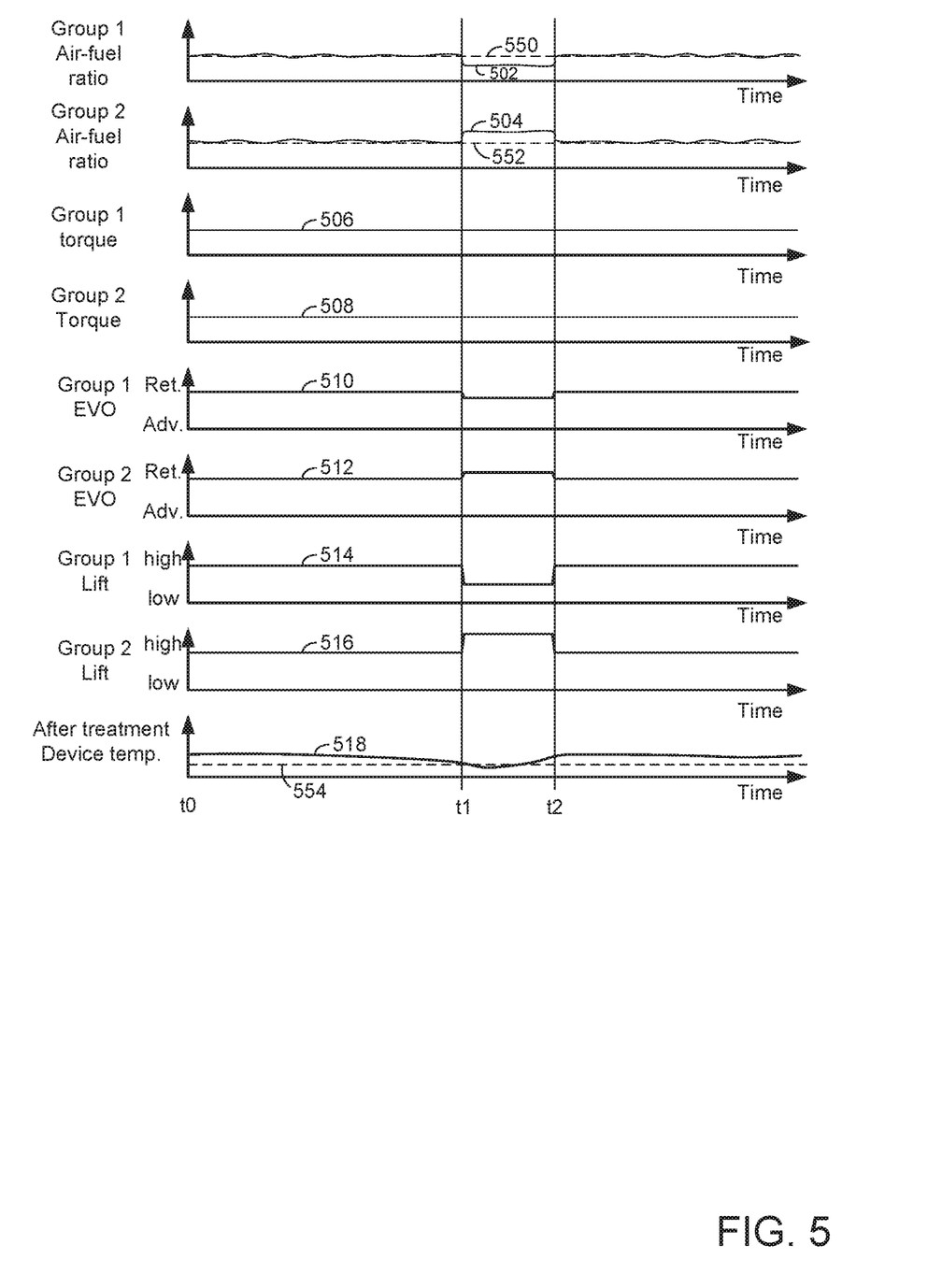
FIG. 5 shows an example engine operating sequence according to the method of FIG. 6.
Figure 6:
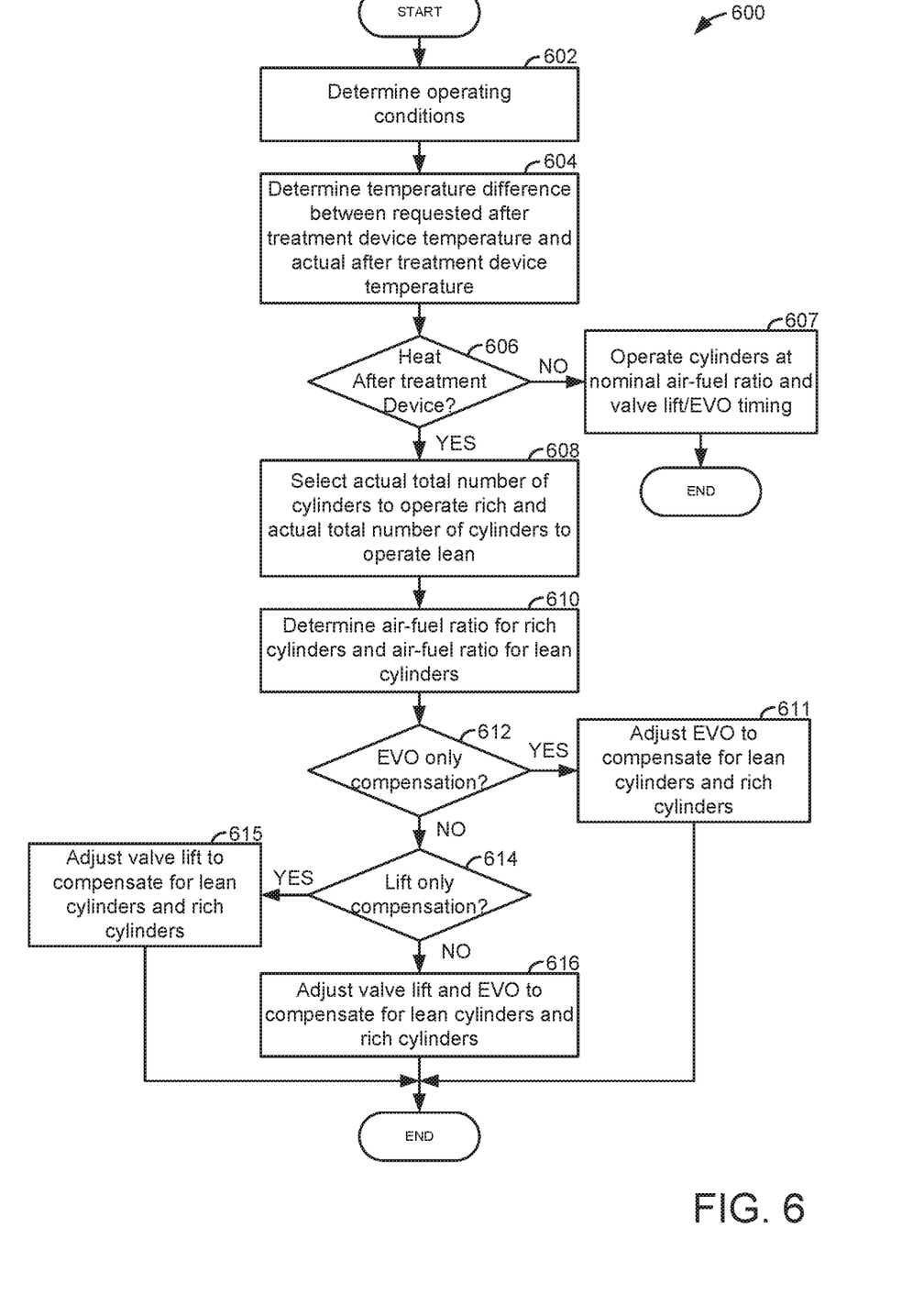
FIG. 6 shows a flowchart of a method for operating an engine.
Figure 7A:
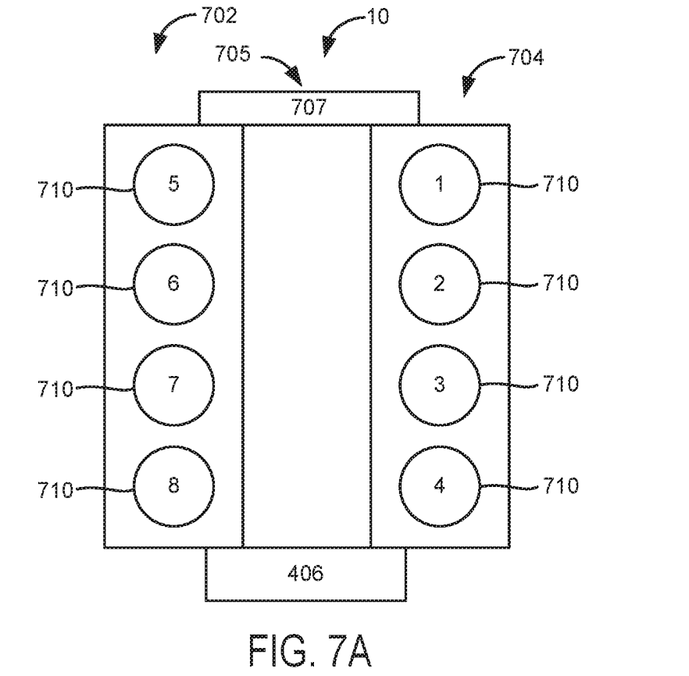
FIGS. 7A and 7B show example engine configurations.
Figure 7B:
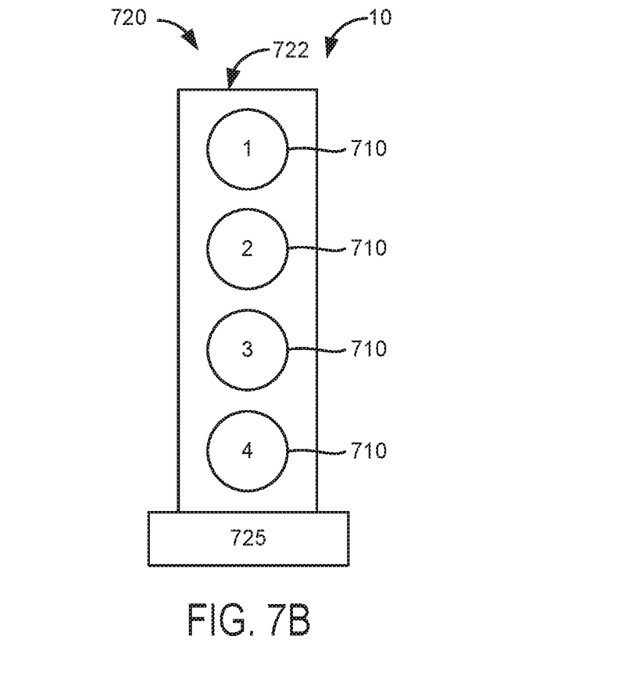

Referring now to FIG. 5, a prophetic example engine operating sequence illustrating the method of FIG. 6 is shown. The operating sequence of FIG. 5 may be provided via the system of FIG. 1 executing instructions according to the method of FIG. 6 that are stored in non-transitory memory. Vertical markers t0-t2 represent times of interest during the sequence. All plots in FIG. 5 are aligned in time and occur at a same time. The sequence of FIG. 5 may be generated via operating the engine at a constant speed and driver demand torque.

The first plot from the top of FIG. 5 is a plot of air-fuel mixture ratios in a first group of engine cylinders versus time. The vertical axis represents air-fuel mixture ratio and air-fuel mixture is leaner in the direction of the vertical axis arrow. The horizontal axis represents time and time increases in the direction of the horizontal axis arrow. Curve 502 represents an air-fuel mixture ratio for a first group of cylinders of an engine. Horizontal line 550 represents a stoichiometric air-fuel ratio.

The second plot from the top of FIG. 5 is a plot of air-fuel mixture ratios in a second group of engine cylinders versus time. The vertical axis represents air-fuel mixture ratio and air-fuel mixture is leaner in the direction of the vertical axis arrow. The horizontal axis represents time and time increases in the direction of the horizontal axis arrow. Curve 504 represents an air-fuel mixture ratio for a second group of cylinders of an engine. Horizontal line 552 represents a stoichiometric air-fuel ratio.

The third plot from the top of FIG. 5 is a plot of torque generated via the first group of engine cylinders versus time. The vertical axis represents an amount of torque that is generated by the first group of engine cylinders and the amount of torque increases in the direction of the vertical axis arrow. The horizontal axis represents time and time increases in the direction of the horizontal axis arrow. Line 506 represents an amount of torque generated by the first group of cylinders of an engine.

The fourth plot from the top of FIG. 5 is a plot of torque generated via the second group of engine cylinders versus time. The vertical axis represents an amount of torque that is generated by the second group of engine cylinders and the amount of torque increases in the direction of the vertical axis arrow. The horizontal axis represents time and time increases in the direction of the horizontal axis arrow. Line 508 represents an amount of torque generated by the second group of cylinders of an engine.

The fifth plot from the top of FIG. 5 is a plot of EVO timing in the first group of engine cylinders versus time. The vertical axis represents EVO timing in the first group of engine cylinders and the EVO timing is retarded in the direction of the vertical axis arrow. The horizontal axis represents time and time increases in the direction of the horizontal axis arrow. Line 510 represents EVO timing in the first group of cylinders of an engine.

The sixth plot from the top of FIG. 5 is a plot of EVO timing in the second group of engine cylinders versus time. The vertical axis represents EVO timing in the second group of engine cylinders and the EVO timing is retarded in the direction of the vertical axis arrow. The horizontal axis represents time and time increases in the direction of the horizontal axis arrow. Line 512 represents EVO timing in the second group of cylinders of an engine.

The seventh plot from the top of FIG. 5 is a plot of intake valve lift in the first group of engine cylinders versus time. The vertical axis represents intake valve lift in the first group of engine cylinders and the intake valve lift is increased (e.g., made higher) in the direction of the vertical axis arrow. The horizontal axis represents time and time increases in the direction of the horizontal axis arrow. Line 514 represents intake valve lift in the first group of cylinders of an engine.

The eighth plot from the top of FIG. 5 is a plot of intake valve lift in the second group of engine cylinders versus time. The vertical axis represents intake valve lift in the second group of engine cylinders and the intake valve lift is increased (e.g., made higher) in the direction of the vertical axis arrow. The horizontal axis represents time and time increases in the direction of the horizontal axis arrow. Line 516 represents intake valve lift in the second group of cylinders of an engine.

The ninth plot from the top of FIG. 5 is a plot of after treatment device temperature versus time. The vertical axis represents after treatment device temperature and the after treatment device temperature is increased (e.g., made higher) in the direction of the vertical axis arrow. The horizontal axis represents time and time increases in the direction of the horizontal axis arrow. Line 518 represents after treatment device temperature. Horizontal line 554 represents a threshold after treatment device temperature. After treatment device heating may be initiated when after treatment device temperature is less than threshold 554.

At time t0, the first group and the second group of engine cylinders are operating with a stoichiometric air-fuel ratio. Torque output by the first and second groups of cylinders is at a middle level and the torque generated by the first group of engine cylinders is equal to the torque generated by the second group of engine cylinders. EVO timing of the first group of cylinders is nominal EVO timing for the engine's present speed and load, and it is equal to EVO timing of the second group of cylinders. Intake valve lift of the first group of cylinders is nominal intake valve lift for the engine's present speed and load, and it is equal to intake valve lift of the second group of cylinders. The after treatment device temperature is above threshold 554.

At time t1, the after treatment device temperature falls below threshold 554. The air-fuel ratio of mixtures in the first group of cylinders is richened in response to the after treatment device temperature falling below threshold 554. The air-fuel ratio of mixtures in the second group of cylinders is made lean in response to the after treatment device temperature falling below threshold 554. Thus, the first group of cylinders outputs combustion byproducts of rich air-fuel mixtures and the second group of cylinders outputs combustion byproducts of lean air-fuel mixtures. The rich byproducts may be oxidized with excess oxygen in the lean byproducts at or in the after treat device to increase the temperature of the after treatment device. Combustion of the rich air-fuel mixture would increase engine torque and combustion of lean air-fuel ratios would decrease engine torque but for adjustments to EVO timing and intake valve lift in the cylinder groups. In particular, EVO timing for the first group of cylinders is advanced to compensate for the engine torque increase that is due to combusting rich air-fuel mixtures in the first group of cylinders. Further, intake valve lift of the first group of cylinders is reduced to compensate for the engine torque increase that is due to combusting rich air-fuel mixtures in the first group of cylinders. In addition, EVO timing for the second group of cylinders is retarded to compensate for the engine torque decrease that is due to combusting lean air-fuel mixtures in the second group of cylinders. In other words, the air charge is increased to compensate for reduced air-fuel ratio. Also, intake valve lift of the second group of cylinders is increased to compensate for the engine torque decrease that is due to combusting lean air-fuel mixtures in the second group of cylinders. Engine torque that is generated via the first and second groups of cylinders is unchanged due to compensating air-fuel ratios using EVO and intake valve lift.

Between time t1 and time t2, the after treatment device temperature is increased and engine torque remains constant. The torque generated via the first group of engine cylinders is equal to the torque that is generated by the second group of cylinders.

At time t2, the after treatment device temperature is above threshold 554 by a predetermined amount. The air-fuel ratio of mixtures in the first group of cylinders is returned to a stoichiometric mixture in response to the after treatment device temperature increasing above threshold 554. The air-fuel ratio of mixtures in the second group of cylinders is also returned to a stoichiometric mixture in response to the after treatment device temperature increasing above threshold 554. EVO timing for the first group of cylinders is returned to nominal EVO timing and EVO timing for the second group of cylinders is returned to nominal EVO timing. In addition, intake valve lift of the first group of cylinders is returned to nominal lift for the engine's present speed and load and intake valve lift of the second group of cylinders is returned to nominal lift for the engine's present speed and load. Engine torque that is generated via the first and second groups of cylinders is unchanged due to returning air-fuel ratios to stoichiometry and reverting to nominal EVO timing and nominal intake valve lift.

In this way, it may be possible to increase the temperature of an after treatment device while maintaining engine torque output. Further, the engine torque output may be smooth since little torque variation between engine cylinders may be present.

Referring now to FIG. 6, a flow chart of a method for controlling an engine and generating heat to warm an exhaust after treatment device is shown. The method of FIG. 6 may be incorporated into and may cooperate with the system of FIG. 1 to provide the operating sequence shown in FIG. 5. Further, at least portions of the method of FIG. 6 may be incorporated as executable instructions stored in non-transitory memory while other portions of the method may be performed via a controller transforming operating states of devices and actuators in the physical world.

At 602, method 600 determines vehicle operating conditions. Vehicle operating conditions may include but are not limited to engine speed, driver demand power or torque, after treatment device temperature, particulate filter soot load, and ambient temperature. The vehicle operating conditions may be determined from the sensors described herein. Method 600 proceeds to 604.

At 604, method 600 determines a temperature difference between a desired or requested after treatment device temperature and an actual after treatment device temperature. The desired or requested after treatment device temperature may be based on particulate filter soot load or desired after treatment device efficiency.

At 606, method 600 judges if heating of the after treatment device is requested. Heating of the after treatment device may be requested if a soot load of a particulate filter is greater than a threshold or if after treatment device temperature is not within a threshold temperature of a requested after treatment device temperature. The requested after treatment device temperature may be a temperature at which the after treatment device efficiency may be greater than a predetermined amount (e.g., 90% efficiency). If method 600 judges that the after treatment heating is requested, the answer is yes and method 600 proceeds to 608. Otherwise, the answer is no and method 600 proceeds to 607.

At 607, method 600 operates the engine's cylinders at a nominal air-fuel ratio (e.g., a stoichiometric air-fuel ratio). Method 600 also operates the engine's intake valves at nominal lift amounts for the engine's present speed and load. In addition, method 600 operates the engine's exhaust valves with nominal EVO timings. Method 600 proceeds to exit.

At 608, method 600 selects an actual total number of cylinders to operate rich and an actual total number of cylinders to operate lean. In one example, method 600 selects half of the engine's cylinders to operate rich and half of the engine's cylinders to operate lean. However, in other examples, the actual total number of the engine's cylinders that operate rich may be different than the actual total number of the engine's cylinders that operate lean. For example, if the temperature difference between the requested after treatment device temperature is small, one of the engine's cylinders may be operated rich and one of the engine's cylinders may be operated lean to increase a temperature of the after treatment device. The engine's remaining cylinders may continue to operate with stoichiometric air-fuel ratios. If the temperature difference between the requested after treatment device temperature is medium, two of the engine's cylinders may be operated rich and two of the engine's cylinders may be operated lean to increase a temperature of the after treatment device. The engine's remaining cylinders may continue to operate with stoichiometric air-fuel ratios. If the temperature difference between the requested after treatment device temperature is large, half of the engine's cylinders may be operated rich and half of the engine's cylinders may be operated lean to increase a temperature of the after treatment device. Additionally, the air fuel ratio deviation can be selected as a function of the desired temperature increase, where a larger air-fuel ratio deviation will result in a larger temperature increase. In one example, method 600 may reference a table or function based on a temperature difference between a requested after treatment device temperature and an actual after treatment device temperature, driver demand torque, and engine speed. The table or function outputs an actual total number of cylinders to operate with rich air-fuel ratios and an actual total number of cylinders to operate with lean air-fuel ratios. The actual total number of cylinders to operate rich and lean may be empirically determined via operating a vehicle on a dynamometer and operating selected cylinders rich while operating other cylinders lean and measuring an amount of time for the after treatment device to reach the requested temperature. Method 600 proceeds to 610 after determining the actual total number of cylinders to operate rich and an actual total number of cylinders to operate lean.

At 610, method 600 determines the rich air-fuel ratio to operate cylinders on and the lean air-fuel ratio to operate cylinders on. In one example, method 600 may determine the lean air-fuel ratios to operate the cylinders on according to the following equation:

$$AFR = AFR\_nom + AFR\_dvt = AFR\_nom + f\!f(Tdes-T) + Pctl(Tdes-T) + Ictl(Tdes-T)$$

where AFR is the air-fuel ratio at which cylinders selected to operate lean are operated at to control after treatment device temperature, AFR_dvt is the cylinder air-fuel ratio deviation from the nominal air-fuel ratio (e.g., a stoichiometric air-fuel ratio) that is present in cylinders that are being operated lean to increase after treatment device temperature, ff is a feedforward air-fuel ratio adjustment that is a function of desired or requested after treatment device temperature Tdes and actual after treatment device temperature T, Pctl is a proportional gain (e.g., scalar real number) for adjusting the lean air-fuel ratio, and Ict is a rich integral gain (e.g., scalar real number) for adjusting the lean air-fuel ratio.

In one example, method 600 may determine the rich air-fuel ratios to operate the cylinders on according to the following equation:

$$AFR = AFR_{nom} - AFR_{dvt} = AFR_{nom} - (f\!f(Tdes-T) + Pctl(Tdes-T) + Ictl(Tdes-T))$$

where AFR is the air-fuel ratio at which cylinders selected to operate rich are operated at to control after treatment device temperature, AFR_dvt is the cylinder air-fuel ratio deviation from the nominal air-fuel ratio (e.g., a stoichiometric air-fuel ratio) that is present in cylinders that are being operated rich to increase after treatment device temperature, ff is a feedforward air-fuel ratio adjustment that is a function of desired or requested after treatment device temperature Tdes and actual after treatment device temperature T, Pctl is a proportional gain (e.g., scalar real number) for adjusting the rich air-fuel ratio, and Ictl is an integral gain (e.g., scalar real number) for adjusting the rich air-fuel ratio. The air-fuel ratios of cylinders that are to be operated rich and of cylinders that are to be operated lean are adjusted according to the above mentioned air-fuel ratio equations. Method 600 proceeds to 612.

At 612, method 600 judges if only EVO compensation for operating the engine's cylinders lean and rich is to be provided. In one example, method 600 may judge if only EVO compensation for operating the engine's cylinders lean and rich is to be provided based on the engine's valve train configuration. In other examples, method 600 may judge if only EVO compensation for operating the engine's cylinders lean and rich is to be provided based on the cylinder's air-fuel deviation from stoichiometric conditions. If the cylinder's air-fuel ratio deviation is a medium amount, then method 600 may judge to provide only EVO torque compensation for cylinders that are operating rich or lean of stoichiometry. If method 600 judges that only EVO compensation is to be provided, method 600 proceeds to 611. Otherwise, the answer is no and method 400 proceeds to 614.

At 611, method 600 adjusts EVO timing without adjusting intake valve lift to compensate for engine torque change that may occur as a result of operating engine cylinders with rich and lean air-fuel ratios. The engine torque, and from it, cylinder torque may be commanded as a function of vehicle speed and propulsion pedal position. Torque generated by a cylinder at the present engine speed and load may be determined via the following equation:

$$Tq\_nom=Tq(AFR\_nom, EVO\_nom, VL\_nom, SPK\_nom, N, L)$$

where Tq_nom is the nominal cylinder torque output, Tq is a function that returns a cylinder torque output that is a function of AFR_nom (nominal air-fuel ratio (stoichiometric)), EVO_nom (nominal exhaust valve opening timing), VL_nom (nominal valve lift), SPK_nom (nominal spark timing), N (engine speed), and L (engine load).

The engine torque when the engine is operating with cylinders that operate rich and cylinders that operate lean to control aftertreatment device temperature with EVO timing adjusted to compensate for cylinder air-fuel ratio deviation from nominal (e.g., stoichiometric) may be determined via the following equation:

$$\begin{aligned} Tq\_nom &= Tq(AFR, EVO, VL, SPK, N, L) \\ &= Tq(AFR\_nom + AFR\_dvt, EVO\_nom + \\ &\quad EVO\_dvt, VL\_nom + VL\_dvt, SPK\_nom + \\ &\quad SPK\_dvt, N, L) \end{aligned}$$

where Tq is a function that returns the torque of a cylinder, AFR_nom is nominal (e.g., stoichiometric) air-fuel ratio, AFR_dvt is the cylinder air-fuel deviation from the nominal cylinder air-fuel ratio, EVO_nom is nominal cylinder EVO timing, EVO_dvt is EVO deviation from nominal cylinder EVO timing, VL_nom is the nominal cylinder intake valve lift amount, VL_dvt is the intake valve lift amount deviation from the nominal cylinder intake valve lift, and SPK_nom is nominal cylinder spark timing, SPK_dvt is spark deviation from nominal cylinder spark timing.

The change in EVO timing from nominal EVO timing may be determined via local inversion of the torque equation and it may be expressed as:

$$EVO\_dvt = -\frac{d(Tq\_nom)}{d(AFR)} \cdot \frac{AFR\_dvt}{\frac{d(Tq\_nom)}{d(EVO\_nom)}}$$

The EVO timing adjustments for rich and lean cylinders may be determined via this equation. The EVO timing of rich and lean cylinders are adjusted from nominal EVO timing according to the EVO timing deviation from nominal EVO timing. Method 600 proceeds to exit.

At 614, method 600 judges if only intake valve lift compensation for operating the engine's cylinders lean and rich is to be provided. In one example, method 600 may judge if only intake valve lift compensation for operating the engine's cylinders lean and rich is to be provided based on the engine's valve train configuration. In other examples, method 600 may judge if only intake valve lift compensation for operating the engine's cylinders lean and rich is to be provided based on the cylinder's air-fuel deviation from stoichiometric conditions. If the cylinder's air-fuel ratio deviation is a small amount, then method 600 may judge to provide only intake valve lift torque compensation for cylinders that are operating rich or lean of stoichiometry. If method 600 judges that only intake valve lift compensation is to be provided, method 600 proceeds to 615. Otherwise, the answer is no and method 400 proceeds to 616.

At 615, method 600 adjusts only intake valve lift without adjusting EVO timing to compensate for engine torque change that may occur as a result of operating engine cylinders with rich and lean air-fuel ratios. Torque generated by a cylinder at the present engine speed and load may be determined as previously described at 611.

The change in intake valve lift from nominal intake valve lift for rich and lean cylinders may be determined via the following equation:

$$VL\_dvt = -\frac{d(Tq\_nom)}{d(AFR)} \cdot \frac{AFR\_dvt}{\frac{d(Tq\_nom)}{d(VL\_nom)}}$$

The intake valve lift adjustments for rich and lean cylinders may be determined via this equation. The intake valve lift of rich and lean cylinders are adjusted from nominal intake valve lift amounts according to the intake valve lift deviation from nominal intake valve lift. Method 600 proceeds to exit.

At 616, method 600 adjusts intake valve lift and EVO timing to compensate for engine torque change that may occur as a result of operating engine cylinders with rich and lean air-fuel ratios. Torque generated by a cylinder at the present engine speed and load may be determined as previously described at 611.

The change in intake valve lift from nominal intake valve lift for rich and lean cylinders may be determined via the following equation:

$$\frac{d(Tq\_nom)}{d(AFR\_nom)} = -\frac{d(Tq\_nom)}{d(EVO\_nom)} \cdot EVO\_dvt - \frac{d(Tq\_nom)}{d(VL\_nom)} \cdot VL\_dvt$$

The intake valve lift adjustments and EVO timing adjustments for rich and lean cylinders may be determined via this equation. The intake valve lift of rich and lean cylinders is adjusted from nominal intake valve lift amounts according to the intake valve lift deviation from nominal intake valve lift. Likewise, the EVO timing is adjusted from nominal EVO timing according to the deviation from nominal EVO timing. Method 600 proceeds to exit.

In these ways, intake and exhaust valves of cylinders that are operated lean and cylinders that are operated rich may be adjusted to provide torque equal to nominal engine torque generated when the engine is not operating with rich and lean cylinders to heat an after treatment device. Further, intake valve lift may be adjusted alone or in combination with EVO timing adjustments to equalize torque that is generated in lean and rich cylinders so that engine torque is smooth and does not appear to oscillate to vehicle passengers.

Thus, the method of FIG. 6 provides for an engine operating method, comprising: combusting rich air-fuel mixtures in a first group of cylinders and combusting lean air-fuel mixtures in a second group of cylinders via a controller in response to a request to heat an exhaust after treatment device; and advancing exhaust valve opening time in the first group of cylinders and retarding exhaust valve closing timing in the second group of cylinders via the controller to equalize torque production between the first group of cylinders and the second group of cylinders.

In some examples, the method includes where the exhaust valve opening timing in the first group of cylinders is advanced to reduce torque production of the first group of cylinders such that torque produced by the first group of cylinders combusting the rich air-fuel mixtures at a first engine speed and driver demand torque is equivalent torque produced by the first group of cylinders combusting stoichiometric air-fuel mixtures at the first engine speed and driver demand torque with nominal exhaust valve opening timing. The method also includes where the exhaust valve opening timing in the second group of cylinders is retarded to increase torque production of the second group of cylinders such that torque produced by the second group of cylinders combusting the lean air-fuel mixtures at a first engine speed and driver demand torque is equivalent torque produced by the second group of cylinders combusting stoichiometric air-fuel mixtures at the first engine speed and driver demand torque with nominal exhaust valve opening timing. The method includes where the first group of cylinders includes an actual total number of cylinders that is equivalent to an actual total number of cylinders in the second group. The method includes where the after treatment device is a particulate filter. The method includes where the after treatment device is a three-way catalyst. The method includes where the first group of cylinders includes a first number of cylinders and where the second group of cylinders includes a second number of cylinders, the first number of cylinders different than the second number of cylinders.

The method of FIG. 4 also provides for an engine operating method, comprising: combusting rich air-fuel mixtures in a first group of cylinders and combusting lean air-fuel mixtures in a second group of cylinders via a controller in response to a request to heat an exhaust after treatment device; and advancing exhaust valve opening time and decreasing intake valve lift in the first group of cylinders and retarding exhaust valve closing timing and increasing intake valve lift in the second group of cylinders via the controller in response to the request to heat the exhaust after treatment device.

In some examples, the method includes where advancing exhaust valve opening time and decreasing intake valve lift in the first group of cylinders and retarding exhaust valve closing timing and increasing intake valve lift in the second group of cylinders equalizes torque production between the first group of cylinders and the second group of cylinders. The method includes where the intake valve lift in the first group of cylinders is a function of a torque that is based on the rich air-fuel mixtures in the first group of cylinders. The method includes where the intake valve lift in the second group of cylinders is a function of a torque that is based on the lean air-fuel mixtures in the second group of cylinders. The method includes where the exhaust valve opening time in the first group of cylinders is a function of a torque that is based on the rich air-fuel mixtures in the first group of cylinders. The method includes where the exhaust valve opening time in the second group of cylinders is a function of a torque that is based on the lean air-fuel mixtures in the second group of cylinders.

Referring now to FIG. 7A, a first configuration of engine 10 is shown. Engine 10 includes two cylinder banks 702 and 704. First cylinder bank 704 includes cylinders 710 numbered 1-4. Second cylinder bank 702 includes cylinders 710 numbered 5-8. Thus, the first configuration is a V8 engine comprising two cylinder banks. Front 705 of engine 10 may include an accessory drive 707, which may include pumps, fans, etc. Transmission 706 is shown coupled to a rear side of engine 10.

Cylinders 710 may be organized into two or more groups and the groups may be based on cylinder firing order. For example, cylinders 1, 4, 6, and 7 may be organized into a first group of cylinders and cylinders 2, 3, 5, and 8 may be grouped into a second group of cylinders. Cylinders in the groups may be operated rich, lean, or with stoichiometric air-fuel ratios. In addition, cylinders of one group may be operated with lean air-fuel ratios while cylinders in a second group may be operated with rich air-fuel mixtures to increase a temperature of an after treatment device.

Referring now to FIG. 7B, a second configuration of engine 10 is shown. Engine 10 includes one cylinder bank 722. Cylinder bank 706 includes cylinders 710 numbered 1-4. Thus, the first configuration is an I4 engine comprising one cylinder bank. All cylinders operating may be a first cylinder operating mode for this engine configuration.

Cylinders 710 may be organized into two or more groups and the groups may be based on cylinder firing order. For example, cylinders 1 and 4 may be organized into a first group of cylinders and cylinders 2 and 3 may be grouped into a second group of cylinders. Cylinders in the groups may be operated rich, lean, or with stoichiometric air-fuel ratios. In addition, cylinders of one group may be operated with lean air-fuel ratios while cylinders in a second group may be operated with rich air-fuel mixtures to increase a temperature of an after treatment device.

In still other examples, different cylinder configurations may be provided. For example, the engine may be a V6 engine or a V10 engine. The different engine configurations may also have different numbers of cylinder operating modes.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
combusting rich air-fuel mixtures in a first group of cylinders and combusting lean air-fuel mixtures in a second group of cylinders via a controller in response to a request to heat an exhaust after treatment device; and
advancing exhaust valve opening time in the first group of cylinders and retarding exhaust valve closing timing in the second group of cylinders via the controller to equalize torque production between the first group of cylinders and the second group of cylinders.

2. The method of claim 1, where the exhaust valve opening timing in the first group of cylinders is advanced to reduce torque production of the first group of cylinders such that torque produced by the first group of cylinders combusting the rich air-fuel mixtures at a first engine speed and driver demand torque is equivalent torque produced by the first group of cylinders combusting stoichiometric air-fuel mixtures at the first engine speed and driver demand torque with nominal exhaust valve opening timing.

3. The method of claim 1, where the exhaust valve opening timing in the second group of cylinders is retarded to increase torque production of the second group of cylinders such that torque produced by the second group of cylinders combusting the lean air-fuel mixtures at a first engine speed and driver demand torque is equivalent torque produced by the second group of cylinders combusting stoichiometric air-fuel mixtures at the first engine speed and driver demand torque with nominal exhaust valve opening timing.

4. The method of claim 1, where the first group of cylinders includes an actual total number of cylinders that is equivalent to an actual total number of cylinders in the second group.

5. The method of claim 1, where the exhaust after treatment device is a particulate filter.

6. The method of claim 1, where the exhaust after treatment device is a three-way catalyst.

7. The method of claim 1, where the first group of cylinders includes a first number of cylinders and where the second group of cylinders includes a second number of cylinders, the first number of cylinders different than the second number of cylinders.

8. A vehicle system, comprising:
an engine including a first group of cylinders and a second group of cylinders;
an exhaust gas after treatment device in pneumatic communication with the engine; and
a controller including executable instructions stored in non-transitory memory to combust rich air-fuel mixtures in the first group of cylinders and lean air-fuel mixtures in the second group of cylinders in response to a request to heat the exhaust gas after treatment device, and decreasing intake valve lift in the first group of cylinders and increasing intake valve lift in the second group of cylinders in response to the request to heat the exhaust gas after treatment device, and where the intake valve lift in the first group of cylinders is a function of a torque that is based on the rich air-fuel mixtures in the first group of cylinders.

9. The system of claim 8, where the intake valve lift of the first group of cylinders is decreased to reduce torque production of the first group of cylinders such that torque produced by the first group of cylinders combusting the rich air-fuel mixtures at a first engine speed and driver demand torque is equivalent torque produced by the first group of cylinders combusting stoichiometric air-fuel mixtures at the first engine speed and driver demand torque with nominal intake valve lift.

10. The system of claim 8, where the intake valve lift in the second group of cylinders is increased to increase torque production of the second group of cylinders such that torque produced by the second group of cylinders combusting the lean air-fuel mixtures at a first engine speed and driver demand torque is equivalent torque produced by the second group of cylinders combusting stoichiometric air-fuel mixtures at the first engine speed and driver demand torque with nominal intake valve lift.

11. The system of claim 8, where the exhaust after treatment device is a particulate filter.

12. The system of claim 8, where the exhaust after treatment device is a three-way catalyst.

13. The system of claim 8, where the intake valve lift in the second group of cylinders is a function of a torque that is based on the lean air-fuel mixtures in the second group of cylinders.

14. An engine operating method, comprising:
combusting rich air-fuel mixtures in a first group of cylinders and combusting lean air-fuel mixtures in a second group of cylinders via a controller in response to a request to heat an exhaust after treatment device; and
advancing exhaust valve opening time and decreasing intake valve lift in the first group of cylinders and retarding exhaust valve closing timing and increasing intake valve lift in the second group of cylinders via the controller in response to the request to heat the exhaust after treatment device.

15. The method of claim 14, where advancing exhaust valve opening time and decreasing intake valve lift in the first group of cylinders and retarding exhaust valve closing timing and increasing intake valve lift in the second group of cylinders equalizes torque production between the first group of cylinders and the second group of cylinders.

16. The method of claim 14, where the intake valve lift in the first group of cylinders is a function of a torque that is based on the rich air-fuel mixtures in the first group of cylinders.

17. The method of claim 14, where the intake valve lift in the second group of cylinders is a function of a torque that is based on the lean air-fuel mixtures in the second group of cylinders.

18. The method of claim 14, where the exhaust valve opening time in the first group of cylinders is a function of a torque that is based on the rich air-fuel mixtures in the first group of cylinders.

19. The method of claim 14, where the exhaust valve opening time in the second group of cylinders is a function of a torque that is based on the lean air-fuel mixtures in the second group of cylinders.

* * * * *